United States Patent
Aoyagi et al.

(10) Patent No.: US 6,670,063 B1
(45) Date of Patent: Dec. 30, 2003

(54) FUEL CELL SYSTEM

(75) Inventors: Satoshi Aoyagi, Saitama (JP); Hiroyuki Abe, Saitama (JP); Hibiki Saeki, Saitama (JP); Yusuke Hasegawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 09/589,130

(22) Filed: Jun. 8, 2000

(30) Foreign Application Priority Data

Jun. 9, 1999 (JP) .......................... 11-161922

(51) Int. Cl.[7] .................. H01M 8/04; G05F 3/04
(52) U.S. Cl. .................. 429/22; 429/23; 429/21; 323/305
(58) Field of Search ................ 429/23, 22, 13, 429/24, 25, 61, 90, 9; 320/132, 134, 136, 103, 6, 31; 323/299, 300, 304, 305

(56) References Cited

U.S. PATENT DOCUMENTS 5,714,874 A * 2/1998 Bonnefoy ................ 323/299
5,929,594 A * 7/1999 Nonobe et al. ............ 320/104
6,214,484 B1 * 4/2001 Hauer ........................ 429/9

FOREIGN PATENT DOCUMENTS

| EP | 334474 | * 9/1989 | ............ H02J/7/34 |
| EP | 782209 | * 2/1997 | ............ H01M/8/04 |
| JP | 8-031328 | 3/1996 | |

* cited by examiner

*Primary Examiner*—Patrick Ryan
*Assistant Examiner*—R Alejandro
(74) *Attorney, Agent, or Firm*—Arent Fox Kintner Plotkin & Kahn, PLLC

(57) ABSTRACT

In the fuel cell (FC) system comprising a FC and a rechargeable battery, a demand power of the FC is calculated by subtracting the charge power to the battery from a demand power signal which indicates the demand value of a load current and using the result. Accordingly, the charge current is never supplied to the battery which is charged to the maximum ratio, which prevents the utilization ratio of the fuel cell from decreasing and which prevents the battery from overcharge. On the other hand, the battery which is discharged to the minimum ratio does not output the discharge power but the charge power is supplied to the battery. Accordingly, it prevents the battery from over discharge.

1 Claim, 6 Drawing Sheets

Characteristics of Output Current S3 and Discharge Current S4 of FIG.2

Battely demand table 31-1 of Fig.4

Limiter table in limiter 31-4 of Fig.4

FUEL CELL SYSTEM

BACKGROUND OF THE INVENTION

1. Field of the Invention

The present invention relates to a fuel cell (hereinafter referred to as "FC") system which may be provided on an electric vehicle comprising an FC and an electric energy buffer such as, for example, a rechargeable battery (hereinafter referred to as "battery") for back up the shortage of the demand power when the transient output of the FC transient outputs and which prevents the discharge for the utilization ratio of the FC.

2. Description of Related Art

The prior art in this field is disclosed in Japanese Patent Publication No. 8-31328.

FIG. 2 is a block diagram showing the conventional FC system disclosed in the aforesaid documents.

The FC system comprises an FC 1 for generating an output current S1 by using supplied reformed gas as a fuel corresponding to the quantity of the fuel. The FC 1 includes a fuel processor (hereinafter referred to as "FP") 1a. The FP 1a inputs a command value S11a of the mass of the reformed gas and supplies the reformed gas corresponding to the command value S11a to the FC 1 and further output a limit current value S1a of the FC output current S1. The FC output current S1 is detected by an FC current sensor 2. The FC current sensor 2 detects the output current S1 and output the detected FC current value S2. The FC 1 is connected to an FC current controller 3 constituted with a DC/DC converter at the output thereof. The FC current controller 3 input the FC output current S1, control the value of the FC output current S1 based on a given FC current control signal 31 and output an output current S3. The FC current controller 3 is connected to an electric energy buffer (for example, a battery) 4 for charging a part of the FC output current S3 as a charge current S3a and output a discharge current S4 at the output thereof. The battery 4 comprises a battery temperature sensor 4a for detecting the temperature of the battery 4 and output a detected battery temperature S4a. The charge current S3a and the discharge current S4 are detected by a battery current sensor 5. The battery current sensor 5 detect the charge current S3a or the discharge current S4 and output a detected current value S5. The FC current controller 3 is connected to an output voltage sensor 6 for detecting the output voltage of the battery 4 and output a detected output voltage value S6.

The temperature sensor 4a, the battery current sensor 5 and the output voltage sensor 6 are connected to a battery controller 7. The battery controller 7 inputs the detected battery temperature S4a, the detected current value S5, and the detected voltage value S6 and then calculates the state of charge (hereinafter called SOC) which shows the ratio of the remaining charge capacity to the rated capacity of the battery 4 and also calculates a battery power S7b which shows the output power of the battery 4.

The output current S3 and the discharge current S4 are detected by a load current sensor 8. The load current sensor 8 detects the output current S3 and the discharge current S4 and outputs a detected load current S8. Further, the FC current controller 3 is connected to a load drive unit 9. The load drive unit 9 inputs the output current S3 and the discharge current S4 and supply a load current corresponding to a given load control signal S10a to a load L. The load drive unit 9 is connected to a load controller 10. The load controller 10 input an input signal ac which show a demand value of the load current S9 and the detected load current value S8 and output a demand power signal S10b which show the demand load current S9 and a load control signal S10a.

The FP 1a, the FC current sensor 2, the FC current controller 3, the battery controller 7 and the load controller 10 are connected to a controller 11. The controller 11 input the limit current value S1a, the detected current value S2, the SOC S7a, the battery power S7b and the demand signal S10b and output a command value S11a and a current controlling signal S11b.

Next, the operation of the FC system of FIG. 2 will be explained.

The command value S11a of the mass of the reformed gas is transferred to the FP 1a from the controller 11, and then the reformed gas having the mass corresponding to the command value S11a is applied to the FC 1 from the FP 1a. The FC 1 output the FC output current S1 corresponding to the mass of fuel. The FC output current S1 is detected by the FC current sensor 2 and then the FC current sensor 2 output the detected FC current S2. Further, the FP 1a output the limit current value S1a of the FC output current S1. The current controller 3 controls the value of the FC output current S1 based on the current control signal S11b and output the output FC current S3. The part of the output current S3 is supplied to the battery 4 as the charge current S3a and the discharge current S4 is outputted from the battery 4. The battery temperature sensor 4a detect the temperature of the battery 4 and output the detected battery temperature S4a. The battery current sensor 5 detect the charge current S3a and the discharge current S4 and output the detected current value S5. The output voltage sensor 6 detect the voltage of the battery 4 and output the detected output voltage S6.

The battery controller 7 input the detected battery temperature S4a, the detected current value S5 and the detected output voltage S6 and output the SOC S7a and the power S7b of the battery. Then, the load current sensor 8 detect the output current S3 and the discharge current S4 and output the detected load current value S8. The load drive unit 9 input the output current S3 and the discharge current S4 and supply the load current S9 corresponding to the load control signal S10a to the load L. The load controller 10 input the input signal ac which show the demand value of the load current S9 and the detected load current S8 and output the demand power signal S10b and the load control signal S10a. The controller 11 input the limit current value S1a, the detected FC current S2, the SOC S7a, the battery power S7b and the demand power signal S10b and output the command value S11a and the current control signal S11b. The controller 11 supply the stable power to the load L even if the response of the FC 1 is delayed because of the large variation of the load L. Further, the controller 11 prevents the battery 4 from over discharge and over charge by correcting the generating power of the fuel corresponding to the SOC S7a of the battery.

However, the prior art battery system of FIG. 2 has the following problems.

FIG. 3 is a graph showing the characteristics of the output current S3 and the discharge current S4 of FIG. 2. The vertical axis shows the voltage and the horizontal axis shows the current.

In the FC system of FIG. 2, as shown in FIG. 3, in the region C having the output current S3 of approximately 140 A or below, the voltage of the output current S3 is larger than the voltage of the battery 4 at no load (approximately 325 V), which means that the battery 4 is normally charged from the FC 1. In the region D having the output current of approximately 140 A or above, the voltage of the output current S3 is smaller than the voltage of the battery 4 at no load, which means that the battery 4 is not charged from the FC 1.

However, the controller 11 controls the FC 1 by correcting the generating power mass of the FC 1 corresponding to the SOC S7a of the battery 4, so that the FC output current S1 is supplied from the FC 1 corresponding to the SOC S7a and the load L. Accordingly, the output current S1 contain the charge current for the battery 4 but the charge current is not used for the charge of the battery 4, which lower the utilization ratio of the FC 1. Furthermore, because the battery 4 is not charged, the SOC S7a is not increased and the mass of the fuel to the FC 1 is increased. Because of this, a fuel control system for the FC 1 comprising an off gas combustor, an evaporator and a reformer which are not shown in FIG. 2 is overheated and overrun, which extremely lower the utilization ratio of the fuel.

SUMMARY OF THE INVENTION

In order to solve the above-described problems, the FC system of the present invention comprises an FC for generating a first output current by using supplied reformed gas as a fuel corresponding to the quantity of the fuel, a fuel processor for receiving a command value of the mass of the reformed gas, supplying the reformed gas corresponding to the command value to the FC, and transmitting a limit current value of the first output current, a first current sensor for detecting a value of the first output current, a current controller constituted by a DC/DC converter for receiving the first output current, controlling the value of the first output current based on a given current control signal, and transmitting a second output current, a rechargeable battery for charging a part of the second output current as a charge current and outputting a discharge current, a battery temperature sensor for detecting the battery temperature and output a detected battery temperature, a second current sensor for detecting the charge current or the discharge current to output a second detected current value, an output voltage sensor for detecting the voltage of the battery and outputting a detected output voltage, a battery controller for receiving the detected battery temperature, the second detected current value and the detected output voltage value, calculating the SOC showing the ratio of the remaining capacity to the rated capacity, and calculating a battery power indicating the power output from the battery, a third current sensor for detecting the second output current and the discharge current to output a third detected current value, a load drive unit for receiving the second output current and the discharge current and supplying a load current to a load corresponding to a given load control signal, a load controller for receiving an input signal indicating the demand value of the load current and the third detected current value and transmitting a demand power signal indicating the demand value of the load current and the load control signal, and a controller for receiving the limit current value, the first detected current value, the SOC, the battery power and the demand load signal and transmitting the command value and the current control signal.

The controller comprises a battery demand power table for receiving the SOC and transmitting the demand power S31-1 of the input and output power of the battery corresponding to the SOC, a first subtracter for subtracting the battery power from the demand power and outputting a first subtraction result, a first PI controller (here P is proportional; I is integration) for receiving and PI-controlling the first subtraction result and transmitting a first control result, a limiter for receiving the SOC, the demand power signal and the first control result and outputting a charge power for the battery by limiting the first control result in the range of the battery power corresponding to the SOC and the demand power signal, a second subtracter for subtracting the charge power from the demand power signal and transmitting a second subtraction result, a demand power calculation unit for receiving the second subtraction result, dividing the second subtraction result by a predetermined efficiency of the current controller to calculate a demand power, a power/supply fuel converter for converting the demand generating power to a command value of the mass of the reformed gas, a power/current converter for receiving the demand power, converting the demand power into the demand current of the FC and transmitting the result, a comparing and select unit for comparing the demand current of the FC with the limit current and selecting the small one to output as a demand value of the second output current, a third subtracter for subtracting the first detected current value from the required value of the second output current and transmitting the third subtraction result, and a second PI controller for receiving and PI-controlling the third subtraction result, generating a second control result and transmitting it to the current controller as a current control signal.

According to the cell system of the present invention, when the charge power limited by the limiter is subtracted from the demand power signal, the second subtraction result is a value that the charge power to the battery is removed from the demand power signal, so that the charge power is never supplied from the FC to the battery which is charged to the maximum ratio. Accordingly, the utilization ratio of the FC can be prevented from decreasing while the battery is prevented from overcharge. Further, the FC is prevented from overrunning.

Further, when the charge power limited by the limiter is subtracted from the demand power signal, in the region of the demand power signal of a predetermined value or above, the second subtraction result is the same as the demand power signal. In the region of the demand power signal of the predetermined value or below, the second subtraction result is the value that the demand power signal is added to the charge power to the battery. Accordingly, the battery which is discharged to the minimum ratio can be prevented from over discharge.

PREFERRED EMBODIMENTS OF THE PRESENT INVENTION

The present invention will be described by referring to the accompanying drawings.

Figure 1:
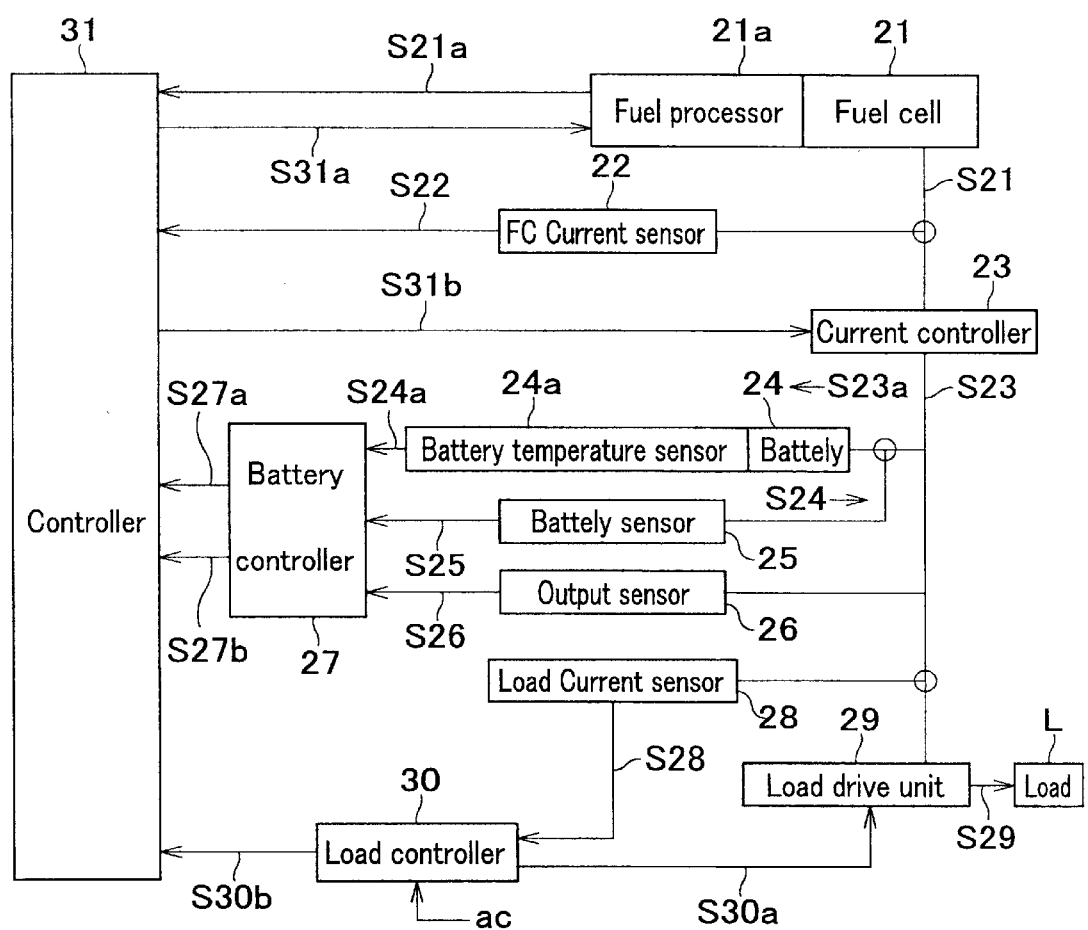
FIG. 1 is a block diagram showing an FC cell system according to an embodiment of the present invention.
Figure 2:
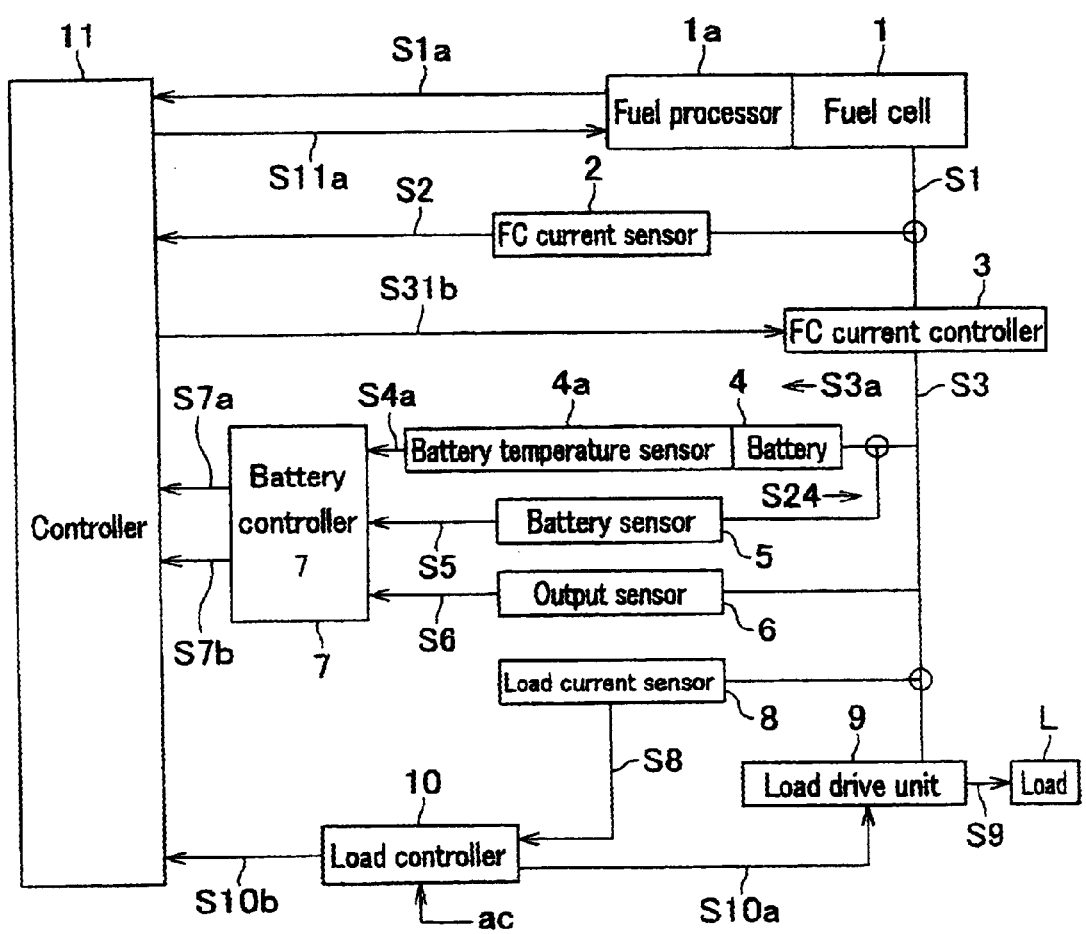
FIG. 2 is a block diagram showing a prior art FC system.
Figure 3:
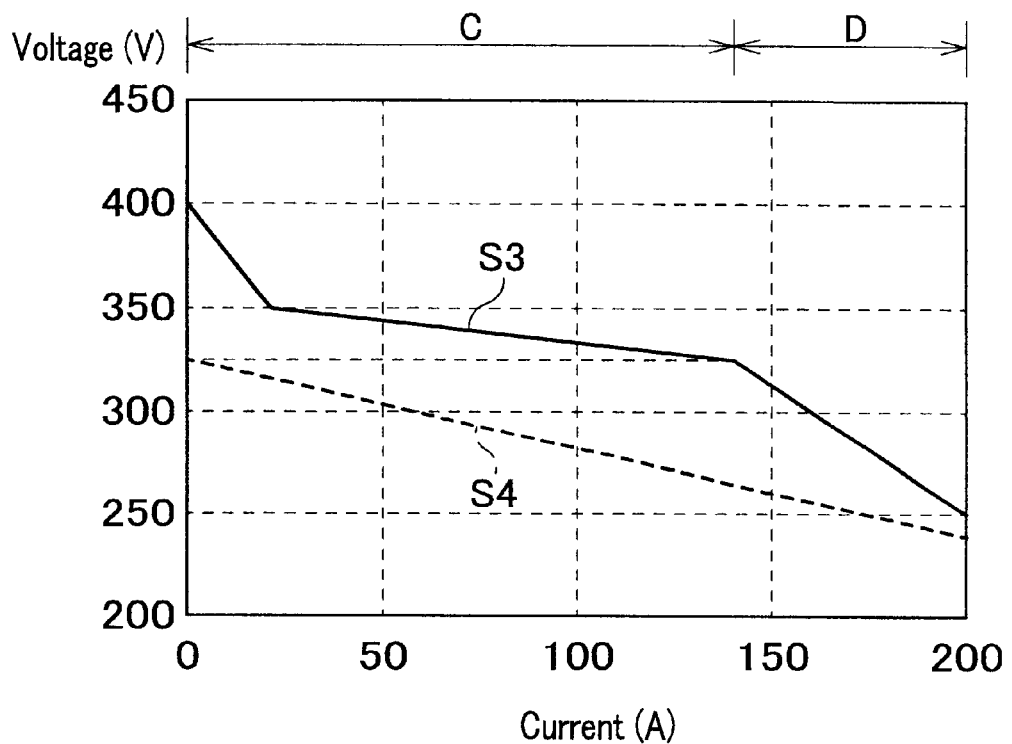
FIG. 3 is a graph showing the characteristics of an output current S3 and a discharge current S4.

FIG. 1 is a block diagram showing an FC system according to one embodiment of the present invention.

The FC system comprises an FC 21 for generating an output current S21 by using supplied reformed gas as a fuel corresponding to the mass of the fuel. The FC 21 includes an FP 21a. The FP 21a inputs a command value S31a of the mass of the reformed gas and supplies the reformed gas corresponding to the command value S31a to the FC 21 and further outputs a limit current value S21a of the output current S21. The output current S21 is detected by an FC current sensor 22. The FC current sensor 22 which may be constituted by a current sensor detect the output current S21 and output the detected FC current value S22. The FC 21 is connected to an FC current controller 23 constituted with a DC/DC converter at the output thereof. The FC current controller 23 input the FC output current S21, control the value of the FC output current S21 based on a given current control signal S31b and output an output current S23. The FC current controller 23 is connected to a battery 24 for charge a part of the output current S23 as a charge current S23a and output a discharge current S24 at the output thereof. The battery 24 comprises a battery temperature sensor 24a for detecting the temperature of the battery 24 and output a detected battery temperature S24a which may be constituted by a temperature sensor. The charge current S23a and the discharge current S24 are detected by a battery current sensor 25. The battery current sensor 25 which may be constituted by a current sensor detect the charge current S23a or the discharge current S24 and output a detected current value S25. The current controller 23 is connected to an output voltage sensor 26 to detect the voltage of the battery 24 and output a detected output voltage S26.

The battery temperature sensor 24a, the battery current sensor 25 and the output voltage sensor 26 are connected to a battery controller 27. The battery controller 27 which may be constituted by an LUT (Look Up Table) input the detected battery temperature S24a, the detected battery current value S25, and the detected output voltage value S26 and then calculates the SOC S27a and also calculates a battery power S27b which shows the output power of the battery 24.

The output current S23 and the discharge current S24 are detected by a load current sensor 28. The load current sensor 28 which may be constituted by a current sensor detects the output current S23 and the discharge current S24 and output the detected load current value S28. Further, the FC current controller 23 is connected to a load drive unit 29. The load drive unit 29 input the output current S23 and the discharge current S24 and supplies a load current corresponding to a given load control signal to a load L. The load drive unit 29 is connected to a load controller 30. The load controller 30 input an input signal ac which show a command of the load current S29 and the detected load current S28 and output a demand power signal S30b which shows the demand load current S29 and a load control signal S30a.

The FP 21a, the FC current sensor 22, the FC current controller 23, the battery controller 27 and the load controller 30 are connected to a controller 31. The controller 31 which may be constituted by a CPU and a large number of logical operation circuits input the limit current value S21a, the detected FC current S22, the SOC S27a, the battery power S27b and the demand power signal S30b and output a command value S31a and a current control signal S31b.

Figure 4:
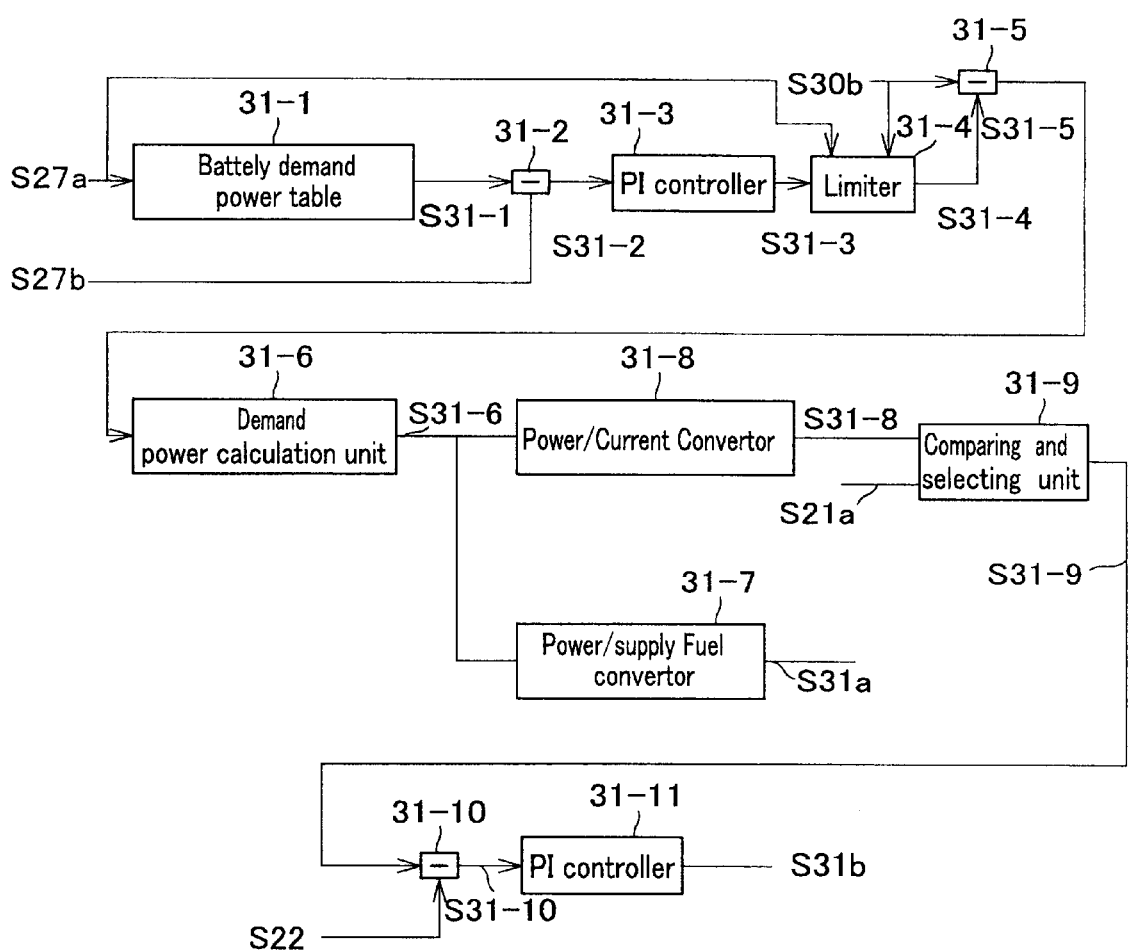
FIG. 4 is a block diagram showing a controller 31 of FIG. 1.

FIG. 4 is a block diagram showing one embodiment of the controller 31 of FIG. 1.

The controller 31 comprises a battery demand power table S31-1. The battery demand power table 31-1 is constituted, for example, by an LUT, which input the SOC S27a and which output the demand power S31-1 of the input and output power of the battery 24 corresponding to the SOC S27a.

The battery demand power table 31-1 is connected to a first subtracter 31-2 to subtract the battery power S27b from the demand power S31-1 and output a first subtraction result S31-2 at the output thereof. The subtracter 31-2 is connected to a first PI controller 31-3 to receive and PI-control the subtraction result S31-2 and transmit a first control result S31-3 at the output thereof. The PI controller 31-3 is connected to a limiter 31-4 at the output thereof. The limiter 31-4 is constituted, for example, by an LUT, which inputs the SOC S27a, the demand power signal S30b and the control result S31-3 and output a charge power S31-4 for the battery 24 by limiting the control result S31-3 in the range of the battery power S27b corresponding to the SOC S27a and the demand power signal S30b.

The limiter 31-4 is connected to a second subtracter 31-5 to subtract the charge power S31-4 from the demand power signal S30b and transmitting a second subtraction result S31-5 at the output thereof. The subtracter 31-5 is connected to a demand power calculation unit 31-6 at the output thereof. The demand power calculation unit 31-6 input the subtraction result S31-5, divide the subtraction result S31-5 by a predetermined efficiency of the FC current controller 23, and calculates a demand power S31-6 of the FC 21.

The demand power calculation unit 31-6 is connected to a power/supply fuel converter 31-7 to convert the demand power S31-6 to a command value S31a of the mass of the reformed gas at the output thereof. Further, the demand power calculation unit 31-6 is connected to a power/current converter 31-8 to receive the demand power S31-6, convert the demand power S31-6 into the demand current S31-8 of the FC 21 and transmit the result at the output thereof. The power/current converter 31-8 is connected to a comparing and selecting unit 31-9 at the output thereof. The comparing and selecting unit 31-9 compares the demand current S31-8 with the limit current value S21a and selects the small one to output as a required value S31-9 of the output current S23. The comparing and selecting unit 31-9 is connected to a third subtracter 31-10 to subtract the detected FC current value S22 from the demand value S31-9 and transmit a third subtraction result S31-10 at the output thereof. The subtracter 31-10 is connected to a second PI controller 31-11 to receive and PI-control the subtraction result S31-10, generate a second control result and transmit it to the current controller 23 as a current control signal S31b at the output thereof.

Figure 5:
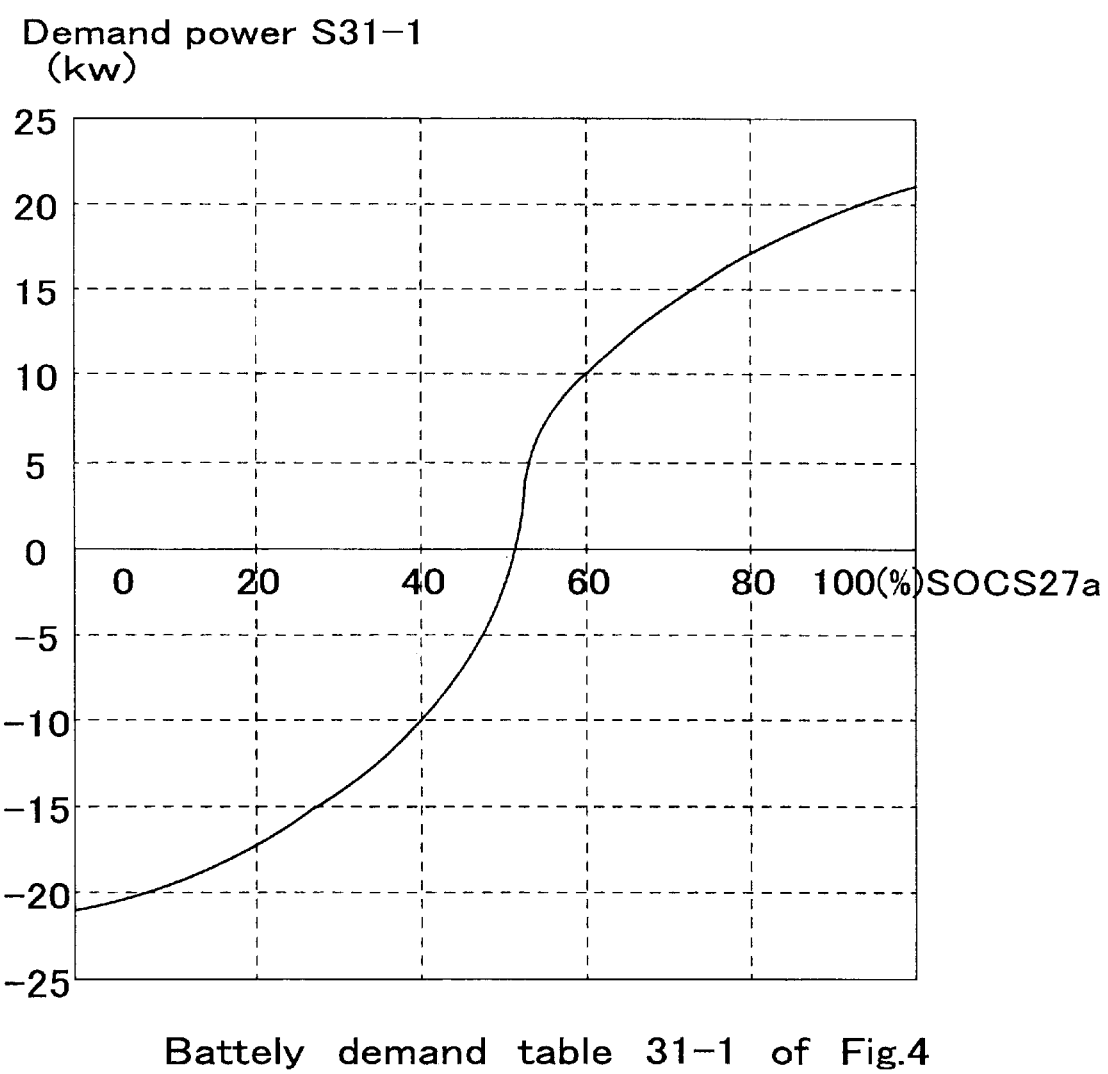
FIG. 5 is a graph showing the characteristics of the battery demand power table 31-1 of FIG. 4.
Figure 6:
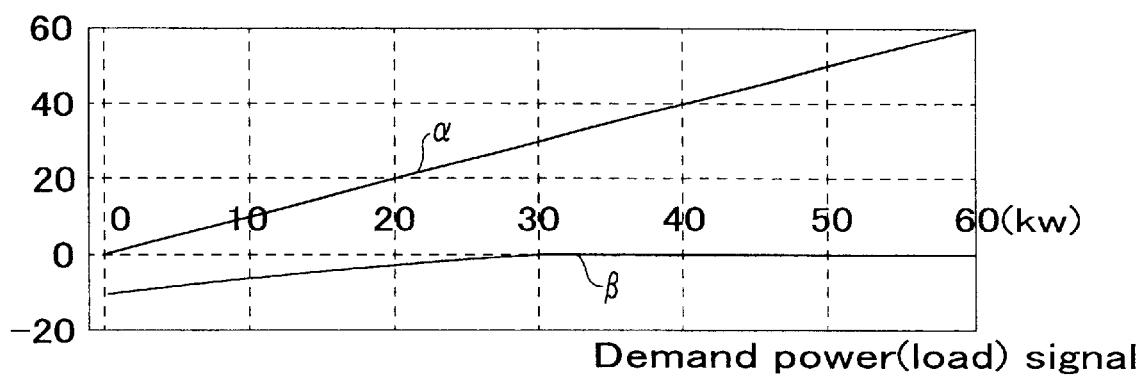
FIG. 6 is a graph showing a limiter table in a limiter 31-4 of FIG. 4.

FIG. 5 is a graph showing one example of the characteristics of the battery demand power table 31-1. The vertical axis shows the demand power S31-1 and the vertical axis shows the SOC S27a. FIG. 6 is a graph showing one example of the characteristics of the limiter table in the limiter 31-4 of FIG. 4. The vertical axis shows the ability of the charge and discharge power S31-4 and the horizontal axis shows the demand power signal S30b.

Referring to FIGS. 5 and 6, the operation of the FC system of FIG. 1 will be explained.

The controller 31 transmits the command value S31a of the mass of the reformed gas to the FP 21a, and the FP 21a supply the reformed gas as a fuel to the FC 21 according to the command value S31a. The FC 21 output the output current S21 corresponding to the mass of the fuel. The FC current sensor 22 detects the value of the output current S21 and output the detected FC current value S22. Further, the FP 21a output the limit current value S21a of the output current S21. The FC current controller 23 controls the value of the output current S21 according to the current control signal S31b and output the output current S23. The battery 24 receive a part of the output current S23 as the charge current S23a and outputs the discharge current S24. The battery temperature sensor 24a detect the temperature of the battery 24 and output the detected battery temperature S24a. The battery current sensor 25 detect the charge current S23a and the discharge current S24 and output the detected battery current S25. The output voltage sensor 26 detect the voltage of the battery 24 and output the detected output voltage S26.

The battery controller 27 inputs the detected battery temperature S24a, the detected battery current value S25, and the detected output voltage S26 and output the SOC S27a and the battery power S27b. The load current sensor 28 detect the output current S23 and the discharge current S24 and output the detected output current value S28. The load drive unit 29 input the output current S23 and the discharge current S24 and supply the load current S29 to the load L according to the load control signal S30a.

The load controller 30 input the input signal ac indicating the demand value of the load current S29 and the detected load current value S28 and output the demand power signal S30b and the load control signal S30a. The controller 31 input the limit current value S21a, the detected FC current value S22, the SOC S27a, the battery power S27b and the demand power signal S30b and output the command value S31a and the current control signal S31b.

In the controller 31, the battery demand power table 31-1 input the SOC S27a and output the demand power S31-1 for the input and output of the battery 24 corresponding to the SOC S27a. In this case, for example, as shown in FIG. 5, in the region having the SOC S27a of 50% or above, it output the demand power S31-1 which is the discharge power from the battery 24 corresponding to the SOC S27a. On the other hand, in the region having the SOC S27a of 50% or below, it output the demand power S31-1 which is the charge power to the battery 24 corresponding to the SOC S27a.

The subtracter S31-2 input the demand power S31-1 and subtract the battery power S27b from the demand power S31-1 to output the subtraction result S31-2. The PI controller 31-3 input and PI-control the subtraction result S31-2 and output the control result S31-3. The limiter 31-4 input the control result S31-3 and limit it into the range of the battery power S27b according to the value of the SOC S27a and the demand power signal S30b, and output the charge power S31-4 for the battery 24. In this case, for example, as shown in FIG. 6, when the SOC S27a is 80% or above, the ability of charge and discharge power S31-4 is shown by a characteristic line α. Then, the limiter 31-4 outputs the ability of the charge and discharge power S31-4 corresponding to the demand power signal S30b on the characteristic line α. When the SOC S27a is less than 20%, the ability of charge and discharge power S31-4 is shown by a characteristic curve β. Then, the limiter 31-4 outputs the ability of charge and discharge power S31-4 corresponding to the value of the demand power signal S30b on the characteristic curve β.

Further, the subtracter 31-5 input the ability of charge and discharge power S31-4 and subtract the ability of charge and discharge power S31-4 from the demand power signal S30b to output the subtraction result S31-5. In this case, for example, when the ability of charge and discharge power S31-4 on the line α is subtracted from the demand power signal S30b, the subtraction result S31-5 is a value that the discharge power to the battery 24 is removed from the demand power signal S30b. Further, when the ability of charge and discharge power S31-4 on the line β is subtracted from the demand power signal S30b, in the region of the demand power signal S30b of 30 kW or above, the subtraction result S31-5 is the same as the value of the demand power signal S30b. On the other hand, in the region of the demand power signal S30b of 30 kW or below, the subtraction result S31-5 is a value that the demand power signal S30b is added to the charge power to the battery 24. The demand power calculation unit 31-6 input the subtraction result S31-5 and divide the subtraction result S31-5 by the efficiency of the current controller 23 to calculate the demand power S31-6 of the battery 24. The power/supply fuel converter 31-7 input the demand power S31-6 and convert it to the command value S31a of the mass of the reformed gas. The power/current converter 31-8 input the demand power S31-6 and convert it into the demand current S31-8 of the FC 24. The comparing and selecting unit 31-9 input the demand current S31-8, compare it with the limit current value S21a and output the small one as the demand 31-9 of the output current S23. The subtracter 31-10 input the demand value S31-9 and subtract the detected FC current value S22 from the demand value S31-9 to output the subtraction result S31-10. The PI controller 31-11 input and PI-control the subtraction result S31-10 and output the current control signal S31b. The current control signal S31b is transmitted to the current controller 23.

As described above, in the present embodiment, when the ability of charge and discharge power S31-4 on the characteristics line α of FIG. 6 is subtracted from the demand power signal S30b, the subtraction result S31-5 is a value that the charge power to the battery 24 is removed from the demand power signal S30b, so that the charge power is never supplied from the FC 21 to the battery 24 that maintains the maximum ratio. Accordingly, the utilization ratio of the FC 21 can be prevented from decreasing while the battery 24 is prevented from over charge. Further, the FC 21 is prevented from overrunning.

Further, when the ability of charge and discharge power S31-4 on the characteristic line β of FIG. 6 is subtracted from the demand power signal S30b, in the region of demand power signal S30b of 30 kW or above, the subtraction result S31-5 is the same as the value of the demand power signal S30b. In the region of demand power signal S30b of 30 kW or below, the subtraction result S31-5 is the value that the demand power signal S30b is added to the charge power to the battery 24. Accordingly, the battery 24 maintaining the minimum ratio can be prevented from the over discharge.

The present invention is not limited to the above embodiment. It can be varied in many ways.

For example, in the characteristics of the battery demand power table 31-1 of FIG. 5, the demand power S31-1 is 0 kW at the SOC S27a of 50%; however, the 50% can be any other value.

Further, in the characteristics of the limiter table of FIG. 6, the charge power S31-4 is 0 kW in the region of the demand power signal S30b of 30 kW or above, 30 kW can be any other value.

Furthermore, the battery 24 of FIG. 1 can be an electric energy storage device such as an electric double layer condenser.

While the invention has been described in detail with reference to the drawings; however, it will be apparent to one skilled in the art that various changes and modifications can be made without departing from the spirit and scope thereof.

What is claimed is:

1. A fuel cell system comprising:

a fuel cell;

a step-down type DC-to-DC converter connected with an output of the fuel cell;

a load connected with the DC-to-DC converter; and a battery connected in parallel with the load to correct an excess and deficiency of a current supplied from the fuel cell to the load, wherein a mass of fuel supplied to the fuel cell is controlled according to a demand power signal indicating a current demanded by the load and a charge condition of battery;

wherein an output current threshold of the fuel cell above which an output voltage of the fuel cell is lower than a no-load voltage of the battery is determined; and wherein if an output current of the fuel cell is greater than the output current threshold, the mass of fuel supplied to the fuel is limited so that the battery is prevented from being charged by the output current of the fuel cell.

* * * * *